Figure 1:
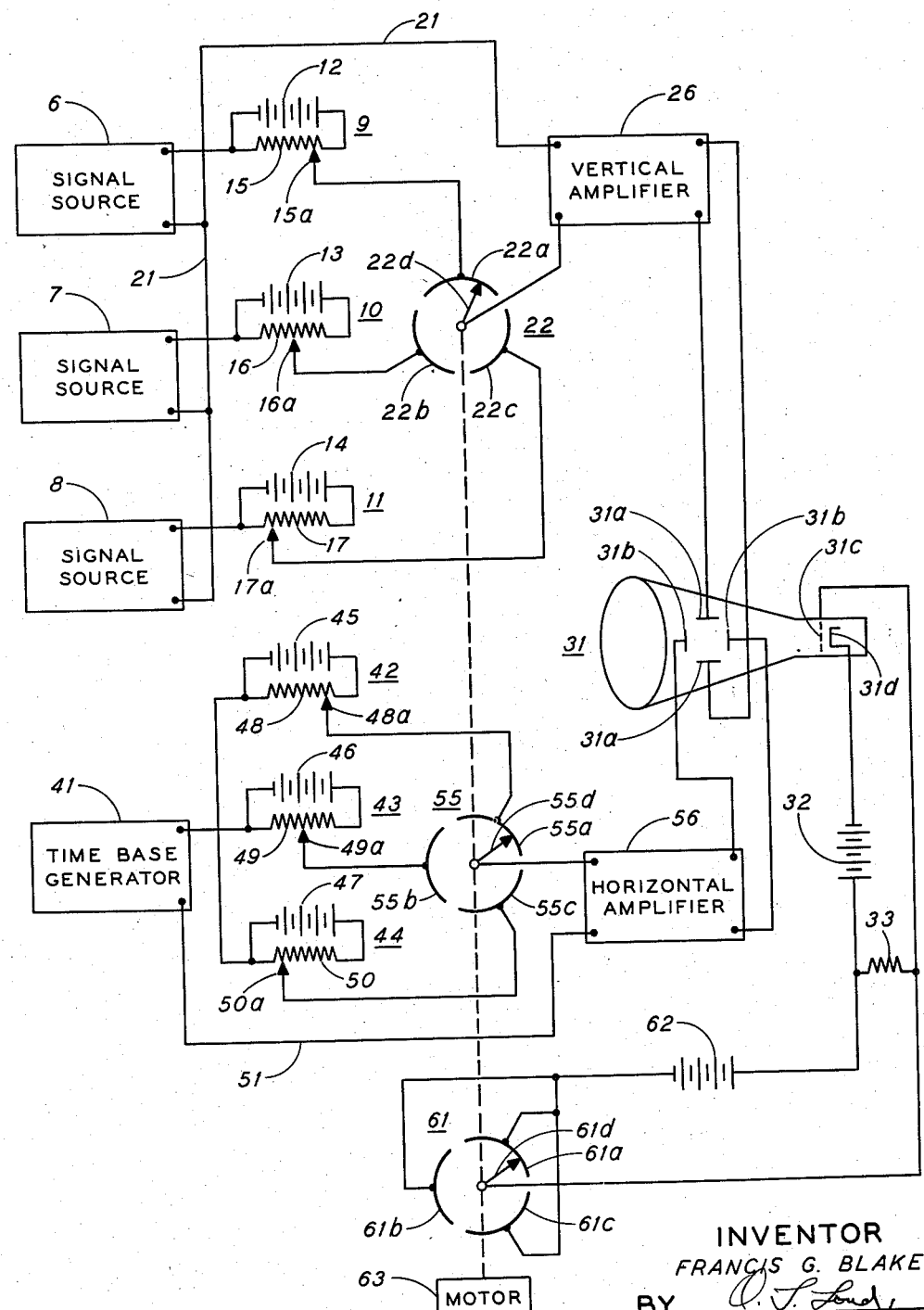

Oct. 28, 1958  F. G. BLAKE  2,858,475
METHOD AND APPARATUS FOR VISUALLY ANALYZING
A PLURALITY OF SIGNALS
Filed Feb. 2, 1954  3 Sheets-Sheet 1

INVENTOR
FRANCIS G. BLAKE
BY
ATTORNEYS

Oct. 28, 1958            F. G. BLAKE            2,858,475
METHOD AND APPARATUS FOR VISUALLY ANALYZING
A PLURALITY OF SIGNALS
Filed Feb. 2, 1954            3 Sheets-Sheet 3
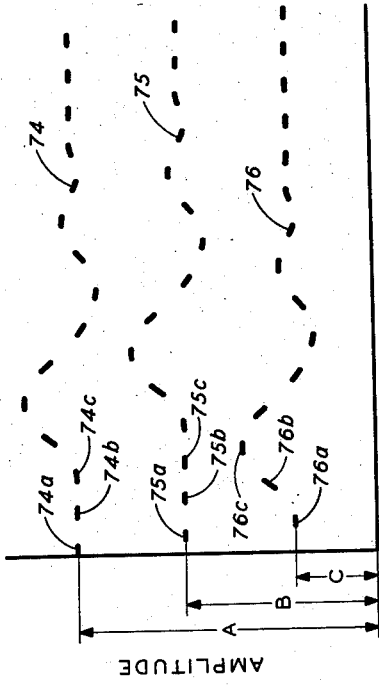
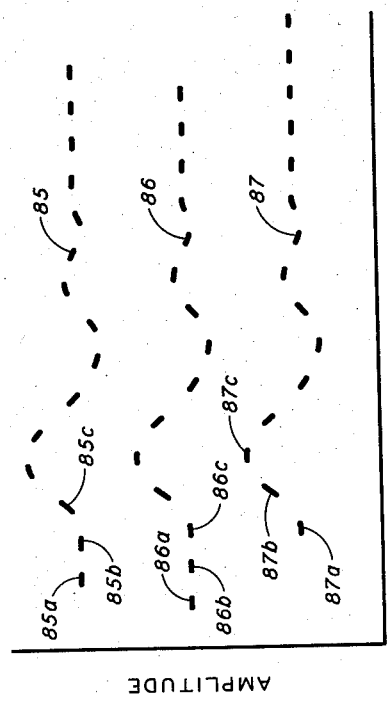
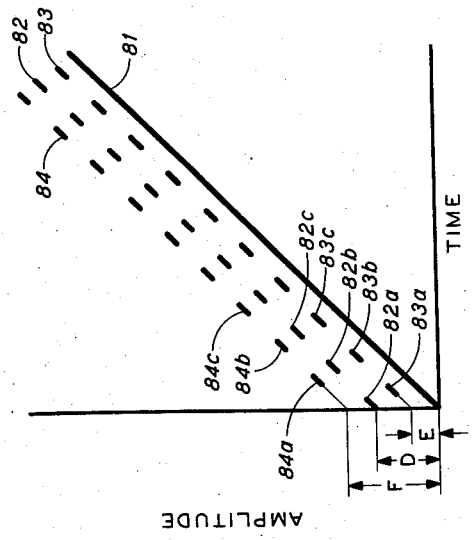
INVENTOR
FRANCIS G. BLAKE
BY
ATTORNEYS

United States Patent Office 2,858,475
Patented Oct. 28, 1958

2,858,475

METHOD AND APPARATUS FOR VISUALLY ANALYZING A PLURALITY OF SIGNALS

Francis G. Blake, Fullerton, Calif., assignor to California Research Corporation, San Francisco, Calif., a corporation of Delaware Application February 2, 1954, Serial No. 407,629

1 Claim. (Cl. 315—26)

This invention relates in general to methods of analysis of data and relates in particular to methods for the graphical analysis of data in the form of a plurality of different but related signals which are functions of a common independent variable.

In the simultaneous or rapid sequential display of a plurality of different but related signals upon an oscilloscope or other suitable display medium, it is often desirable to intercompare the variation of these signals with respect to time or some other common independent variable. For example, in the seismic prospecting art the seismic waves generated by an explosion or other suitable source of seismic energy are picked up by a plurality of receptors or geophones arranged in known spatial relationships to the point of explosion. The outputs of the different geophones, corresponding to the seismic energy received at the geophones by reflection, refraction or diffraction of the original seismic energy, are recorded as a plurality of traces or tracks recorded side by side on a so-called phonographically reproducible record. The recording medium may be photographic, phonographic, or magnetic, and serves to produce a record of the received seismic energy which may be reproduced repeatedly and at will. The reproducible record so obtained may then be played back, usually in a laboratory, and the data contained therein analyzed by suitable means such as oscilloscopic display.

In the analysis of such records, the variations in the different traces with respect to time are intercompared, and, as an aid in such intercomparison, it is often desirable to produce effective time shifts of the different displayed traces with respect to each other. Such effective time shifts may be utilized, for example, to compensate for the step-out of the geophone signals. Since the geophones are spaced different distances from the source of the seismic energy, a given seismic wave reflected from a given interface will arrive at the different geophones at different times in accordance with the spacing of the geophones with respect to the source and the point of reflection. This time difference between the arrival of a given reflection at separate geophones is known as the step-out and causes a given reflection to appear at different times on the various recorded traces.

An additional operation in which it is desirable to produce effective time shifts in the displayed traces is in compensating for the variable delays occasioned by the travel of the reflected waves through the so-called weathered layer of the earth's surface. In the above operations, the information contained in the traces is displayed in such a manner that a seismic wave from a given reflecting interface appears to have arrived at all of the geophones either simultaneously or in some other relationship to time different from the actual relationship obtaining when the record was made.

Heretofore, such effective time shifts have been accomplished by introducing actual time delays in the different traces by use of acoustical, electromechanical or electric delay lines, or by moving the different pick-up means on the reproducing medium varying amounts to cause the pick-up means to effectively shift the time sequence of the reproduced traces relative to each other. It has also been proposed to display the different traces by means of a multi-gun oscilloscope in which each trace is displayed by a separate gun, thereby permitting shifting of the displayed traces relative to each other. However, these systems have the disadvantage of being extremely complex and expensive owing to the large amount of associated equipment and circuitry required.

These disadvantages can be overcome by utilizing oscilloscopic display means having a single index which is deflected in one dimension by pulses obtained by sequentially sampling a plurality of signals differing from, but corresponding to, the traces to be analyzed and which index is deflected in another dimension by pulses obtained by sequentially sampling, in synchronism with the other sampling, a plurality of different signals which are dependent upon the independent variable. The amounts by which the sampled signals differ from the values of the variables to which they correspond is adjustable and the amounts of these differences determines the extent to which the displayed data differs from the data as originally recorded.

It is therefore an object of the present invention to provide an improved method and apparatus for graphically displaying variations in a plurality of different but related signals as a function of a common independent variable.

It is an additional object of the present invention to provide methods and apparatus for graphically displaying variations of a plurality of different but related signals as a function of a common independent variable in which the relationships of the signals to each other and to the common independent variable appear different from the actual relationships.

It is a further object of the present invention to provide improved methods and apparatus for graphically analyzing as a function of time a plurality of related but different signals varying with time in which the relationships of the amplitudes of such signals to each other and the relationship of such signals to time appears different from the actual relationship.

It is an additional object of this invention to provide improved methods and apparatus for the graphic display of variations of a plurality of different but related signals as a function of a common independent variable in which signals dependent upon the original signals are sequentially sampled in synchronism with the sampling of signals dependent upon the independent variable and the sampled portions of such signals oscilloscopically displayed.

Figure 6:
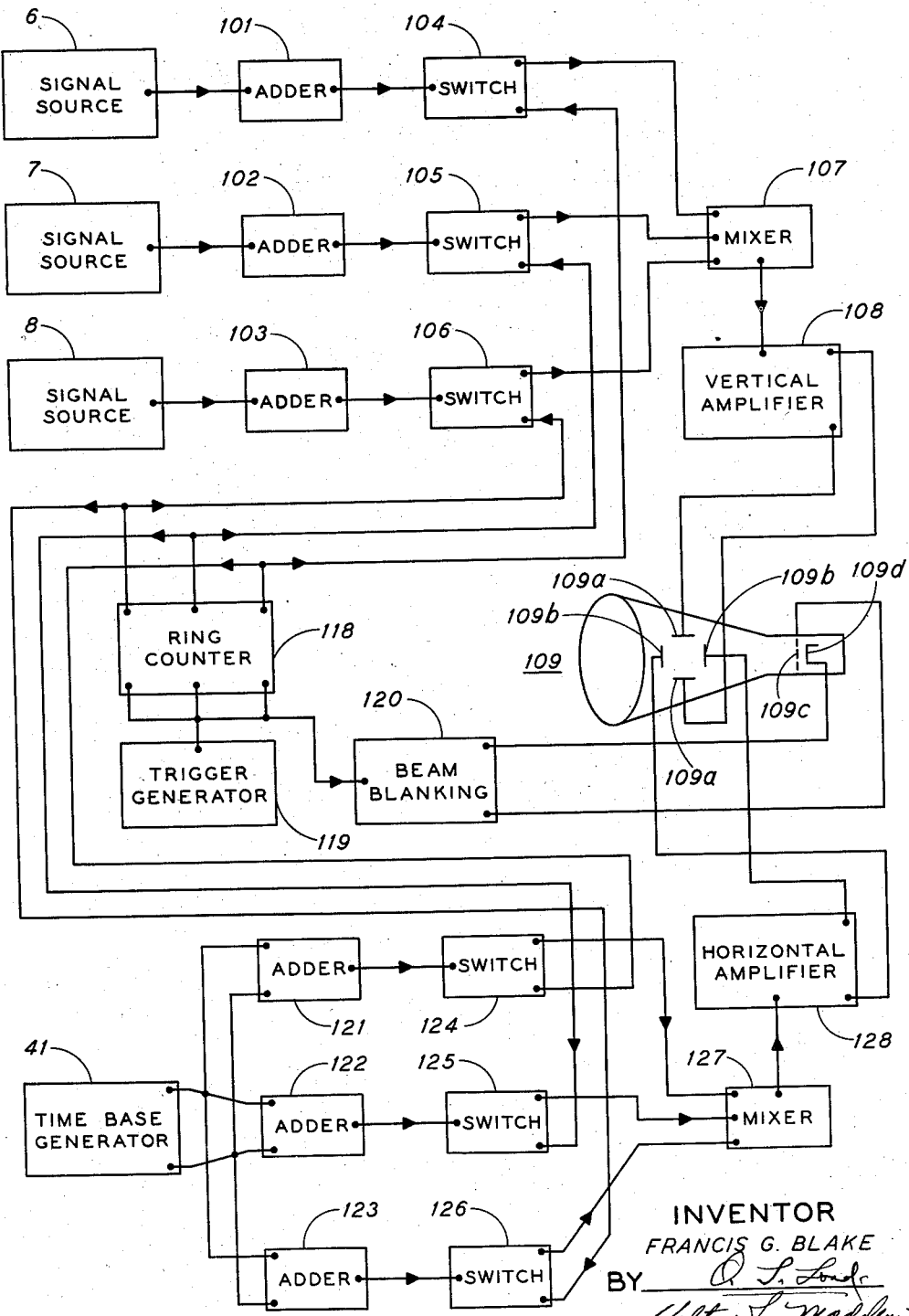

Objects and advantages other than those described above will be readily apparent from the following detailed description when read in connection with the accompanying drawing, in which:

Fig. 1 diagrammatically illustrates one embodiment of the invention utilizing mechanical sampling of the data to be displayed;

Figs. 2, 3 and 4 are graphs illustrating the wave forms of the various signals utilized in this invention; Fig. 5 is a graph illustrating one type of graphic display obtained by this invention; and Fig. 6 is one alternate embodiment of the invention utilizing electronic sampling of the signals.

Fig. 1 illustrates one embodiment of the invention adapted to display a plurality of separate but related signals as a function of a common independent variable. The signals to be analyzed may be, for example, seismic signals received at a plurality of receptors or geophones from an explosion of dynamite or other source of seismic energy. The geophones produce electrical signals varying in accordance with variations in the amplitudes of the seismic waves received at the geophones. The output signals of the geophones may be analyzed directly, but preferably they are recorded on reproducible records and are then analyzed, usually in the laboratory, by playing back the reproducible record and examining the data or selected portions thereof contained on the record.

The reproducible record may be in the form of a photographic film on which the signals corresponding to the separate geophone outputs are recorded as a plurality of variable area or variable density traces or tracks. The phonographically reproducible record may also be in the form of a phonographic record on which a plurality of styli make grooves or other impressions corresponding to the geophone outputs. Alternatively, the reproducible record may be in the form of a magnetic tape or drum upon which the geophone outputs are recorded in the form of a plurality of variably-magnetized tracks or traces. The information contained on the reproducible record may be picked up by a suitable pickup means, such as scanning slits in the case of photographic records, a phonographic pickup in the case of phonographic records, and a magnetic pickup in the case of a magnetizable recording medium. The pickup means of the phonographically reproducible recording medium converts the traces or tracks on the record into electrical signals proportional to or otherwise dependent upon seismic waves received by the geophones.

In Fig. 1, a plurality of sources of signals to be analyzed are shown diagrammatically at 6, 7 and 8. Such sources may be pickup means associated with a reproducible recording medium for converting the tracks on the phonographically-reproducible record into electrical signals corresponding to the tracks. Each of pickup means 6, 7 and 8 may be considered to comprise a signal-generating source, and each is connected to means for generating a bias signal which is combined with the signal produced by an associated pickup. The sources of the bias voltages may comprise potentiometers 9, 10 and 11 in the form of batteries 12, 13 and 14 connected across resistors 15, 16 and 17. Resistors 15, 16 and 17 are each provided with an adjustable tap 15a, 16a and 17a, respectively, to vary the bias signal combined with the output signal of its associated pickup. One terminal of each of pickups 6, 7 and 8 is connected to a common terminal of its associated potentiometer, and the other output terminals of pickups 6, 7 and 8 are connected together to a common conductor 21. These signals generated by pickups 6, 7 and 8 are thus combined with bias signals obtained from potentiometers 9, 10 and 11 to produce between conductor 21 and the adjustable taps 15a, 16a and 17a a group of electrical signals corresponding to the recorded tracks but differing therefrom by the different bias signals introduced by the potentiometers.

Adjustable taps 15a, 16a and 17a are connected, respectively, to separated, electrically-conductive segments 22a, 22b and 22c of a commutator-type switch 22 having an arm 22d sequentially movable over the segments. Arm 22d is connected to an input terminal of an amplifier 26, and the other input terminal of amplifier 26 is connected to conductor 21. Thus, rotation of arm 22d produces a sequential sampling of the group of electrical signals generated by pickups 6, 7 and 8 and their associated potentiometers, and the series of pulses resulting from this sequential sampling are impressed on the input terminals of amplifier 26. The output terminals of amplifier 26 are connected to the deflecting means of suitable oscilloscopic display apparatus shown diagrammatically as a cathode ray tube 31 having a pair of horizontal deflection plates 31b and a pair of vertical deflection plates 31a connected to amplifier 26. Tube 31 has an index in the form of a beam of cathode rays generated by a cathode 31d and controlled in intensity by a grid 31c connected to the cathode through a battery 32 and a resistor 33. The beam of cathode rays thus generated is movable over the face of tube 31 in response to the signals applied to deflection plates 31a and 31b, as is well known in the art.

Means are provided for generating a group of electrical signals corresponding to the independent variable to which the signals to be analyzed are related, which variable, in the case of seismic data, is time. Such a generator may comprise a conventional time-base generator 41 for generating a saw-tooth wave whose amplitude is a linear function of time. One terminal of time-base generator 41 is connected to a conductor 51, and the other terminal of generator 41 is connected to each of a plurality of potentiometers 42, 43 and 44 in the form of batteries 45, 46 and 47 and resistors 48, 49 and 50. The signals generated by time-base generator 41 are thus combined with the bias signals provided by potentiometers 42, 43 and 44 to produce between conductor 51 and the adjustable taps 48a, 49a and 50a of resistors 48, 49 and 50 a plurality of electrical signals which are linearly proportional to time but which differ from each other in amplitude by the differences between the voltages of potentiometers 42, 43 and 44.

The adjustable taps 48a, 49a and 50a are connected to separated, electrically-conductive segments 55a, 55b and 55c of a second commutator-type sampling switch 55 having an electrically-conductive arm 55d. Arm 55d is connected to an input terminal of an amplifier 56, and the other input terminal of amplifier 56 is connected through conductor 51 to the other output terminal of time-base generator 41. Rotation of arm 55 thus sequentially samples the plurality of signals generated by generator 41 and potentiometers 42, 43 and 44 to impress on amplifier 56 a series of deflection pulses which are transmitted to horizontal deflecting plates 31b of tube 31.

A third switch 61 may also be provided having segments 61a, 61b and 61c and a rotatable arm 61d. Segments 61a, 61b and 61c are all connected to a common terminal of a battery 62 which has its other terminal connected to one terminal of resistor 33. Arm 61d is connected to the other terminal of resistor 33. Rotation of arm 61d thus alternately connects and disconnects battery 62 from the grid biasing circuit of tube 31 to alternately vary the potential impressed on grid 31c with respect to cathode 31d. Battery 62 is so poled as to make the bias on grid 31c more positive, so that the intensity of the beam of cathode rays is brightened during the period when battery 62 is connected to grid 31c and cathode 31d. Switches 22, 56 and 61 are all ganged together, as shown by the dotted line, and are driven in synchronism by suitable driving means such as a motor 63.

The operation of this invention will become apparent from the curves of Figs. 2, 3, 4 and 5, which graphically illustrate the operation of the embodiment illustrated in Fig. 1. In Fig. 2, the curves 71, 72 and 73 represent signals to be analyzed, such as seismic traces, recorded side by side on a reproducible record. The signals are shown in the form of curves having amplitudes varying as a function of time. Assuming that pickup devices 6, 7 and 8 produce outputs which are proportional to the traces or tracks on the reproducible record, curves 71, 72 and 73 may also represent the outputs of these pickup devices.

For simplicity, only three curves have been shown, and these curves have been shown as simple damped sine waves, although in practice the curves usually have a considerably more complex wave form. It will be seen that the first peak or hump in each of the curves 71, 72 and 73, corresponding to the arrivals of a given reflection at the different geophones with which the curves are associated, occurs at different times in dependence upon the location of the geophones with respect to the source of seismic energy. To aid in the detection of the reflection represented by the first peak in each of these curves, it may be desirable to display the curves in such a manner that these peaks appear to occur simultaneously.

Fig. 3 graphically illustrates the wave form of curves 71, 72 and 73 as modified by the addition thereto of one particular set of values of the bias signals from potentiometers 9, 10 and 11. Curve 71 has had added thereto from potentiometer 9 a component of constant amplitude A to effectively increase the amplitude of curve 71 to a value represented by curve 74. Similarly, curve 72 has been increased in amplitude to a value represented by curve 75 by the addition from potentiometer 10 of a bias signal of constant amplitude B. Curve 73 has been increased in amplitude to a value represented by curve 76 by the addition from potentiometer 11 of a bias signal of constant amplitude C. Curve 74 thus corresponds to the signal impressed between commutator segment 22a and conductor 21; curve 75 corresponds to the signal impressed between commutator segment 22b and conductor 21; and curve 76 corresponds to the signal impressed between commutator segment 22c and conductor 21. Rotation of switch 22 thus produces sequential sampling of signals having the wave forms of curves 74, 75 and 76 to impress on amplifier 26 a series of deflection pulses which are amplified and impressed on vertical deflecting plates 31a.

Fig. 4 graphically illustrates the wave forms of the signals generated by the time-base generator 41 and the effect on such signals of the addition thereto of the bias signals from potentiometers 42, 43 and 44. Curve 81 represents the output signal of time-base generator 41 and is a conventional saw-tooth wave having an amplitude increasing linearly with time. Curve 82 represents curve 81 as modified by the addition thereto of a bias signal of constant amplitude D obtained from potentiometer 42. Similarly, curve 83 represents curve 81 as modified by the addition thereto of a bias signal component of constant amplitude E obtained from potentiometer 43, and curve 84 represents curve 81 as modified by the addition thereto of a bias signal component of constant amplitude F obtained from potentiometer 44. Curve 82 represents the signal impressed between commutator segment 55a and conductor 51, one output terminal of time-base generator 41; curve 83 represents the signal impressed between commutator segment 55b and conductor 51; and curve 84 represents the signal impressed between commutator segment 55c and conductor 51. Rotation of switch 55 thus produces sequential sampling of signals having the wave forms of curves 82, 83 and 84 to impress on amplifier 56 a series of deflection pulses which are amplified and impressed on horizontal deflecting plates 31b of tube 31.

The wave forms as displayed on the face of tube 31 are as shown in the curves of Fig. 5. To aid in understanding the curves of Fig. 5, assume that switch arms 22d, 55d and 61d are rotating and are at the moment in contact with sectors 22a, 55a and 61a, respectively. With arm 22d in contact with sector 22a, pickup 6 and potentiometer 9 are connected to vertical deflecting plates 31a through amplifier 26. Starting at time $t_0$ in Fig. 3, the amplitude of the combined signal generated by pickup 6 and potentiometer 9 at this instant corresponds to point 74a of curve 74, so that the beam of cathode rays of tube 31 has a vertical component of deflection dependent upon the amplitude of point 74a.

Simultaneously therewith, assuming that time-base generator 41 is synchronized with pickups 6, 7 and 8, time-base generator 41 and potentiometer 42 supply to horizontal deflecting plates 31b through amplifier 56, switch arm 55d and sector 55a a horizontal component of deflection corresponding to the amplitude of point 82a of curve 82 in Fig. 4. The resultant deflection of the cathode ray beam by the above two described deflection components causes the beam to be positioned at a point 85a, as shown in Fig. 5.

When switch arm 22d moves from sector 22a to sector 22b, signal source 7 and potentiometer 10 are connected through sector 22b and switch arm 22d to amplifier 26 and conductor 21 to impress on vertical deflection plates 31a a deflection pulse having an amplitude corresponding to point 75a of curve 75. The amplitude of point 75a is less than the amplitude of point 74a so that the vertical deflection component impressed on plates 31a is less than the deflection component impressed thereon when switch arm 22d contacted sector 22a.

Simultaneously with the connection of switch arm 22d to sector 22b, arm 55d contacts sector 55b to impress on horizontal deflection plates 31b through amplifier 56 a horizontal deflection component proportional to the amplitude of point 83a of curve 83. The amplitude of point 83a is less than the amplitude of the point 82a which had been previously sampled, so that the horizontal deflection component is decreased with respect to its value during the sampling of the preceding sector. The beam of cathode rays is thus deflected to a point 86a in Fig. 5 as a result of the horizontal and vertical deflection components described above.

When arm 22d contacts sector 22c, the combined signal generated by pickup 8 and potentiometer 11 is connected through sector 22c and arm 22d to amplifier 26 to impress on vertical deflection plates 31a a pulse having a magnitude proportional to the amplitude of point 76a of curve 76. The amplitude of point 76a is less than the amplitude of point 74a and 75a so that the amplitude of the vertical deflection component of tube 31 at this time is less than its amplitude during the sampling of the two preceding sectors.

Simultaneously with the contact of arm 22d with sector 22c, arm 55d contacts sector 55c to connect time-base generator 41 and potentiometer 44 through sector 55c and arm 55d to amplifier 56 to impress on horizontal deflection plates 31b a horizontal deflection component proportional to the amplitude of point 84a of curve 84. The amplitude of point 84a is greater than the amplitude of points 82a and 83a so that the horizontal deflection component of tube 31 is increased with respect to its value during the sampling of the two preceding sectors. The resultant deflection produced by components 76a and 84a causes the cathode ray beam to be deflected to a point 87a in Fig. 5.

When arm 22d again arrives on sector 22a, the amplitude of the signal generated by pickup 6 and potentiometer 9 corresponds to point 74b of curve 74. Simultaneously therewith, arm 55d is connected to sector 55a to sample the signal generated by time-base generator 41 and potentiometer 42 at a point corresponding to point 82b of curve 82. The beam of cathode rays is thus deflected in response to the resultant of the vertical deflection component represented by point 74b and the horizontal deflection component represented by point 82b to deflect the beam to the position represented by point 85b in Fig. 5.

This sampling continues with synchronized rotation of switch arms 22d and 55d to cause sequential sampling of the separate groups of signals represented by curves 74, 75, 76 and curves 82, 83, 84. The beam of cathode rays is thus deflected in response to the resultant of the two series of synchronized pulses to trace out curves 85, 86 and 87 in Fig. 5. The complete curves 85, 86 and 87 are preferably traced out within the period of persistence of vision of the particular phosphor used on the cathode ray tube screen so that the curves may be simultaneously viewed and their relative positions adjusted, if necessary, by adjustment of adjustable taps 15a, 16a, 17a, 42a, 43a and 44a.

Although, in the operation of the embodiment described above, it was assumed that it was desired to graphically present traces 71, 72, 73 in such a manner that the first peaks of each of these traces appear to be coincident in time, it will be obvious that the traces may be displayed in a wide range of other apparent time relationships to each other by suitable adjustment of the adjustable taps 42a, 43a and 44a.

Switch 61, driven in synchronism with switches 22 and 55, operates to virtually suppress the beam of cathode rays during the periods when switch arms 22d and 55d are moving between adjacent sectors so that the curves 85, 86 and 87 will consist of a series of pulses or spots separated by a spacing corresponding to the separation between adjacent sectors of switches 22, 55 and 61. The suppression of the beam during switching from segment to segment, eliminates switching transients, and aids in obtaining a better definition of the curves.

It will be seen that the above-described method of displaying the data gives the individual curves the appearance of having been both delayed with respect to each other in time and varied with respect to each other in amplitude.

In the embodiment illustrated in Fig. 1, mechanical switches were illustrated in connection with the sequential sampling of the groups of signals. The use of such mechanical switches is satisfactory in the case where a relatively small number of traces are to be analyzed. However, where a considerable number of traces or tracks are to be analyzed, mechanical sampling is not too suitable. For example, assume that ten separate traces are to be examined, each composed of a number of Fourier components. Assume that the wave length of the highest frequency component to be resolved is approximately 5 times the width of the line traced out by the spot on the oscilloscopic face. Then the required number of samples per wave length is not more than 5 because the spots will then be contiguous at such a sampling rate.

If, for example, the frequency of the highest Fourier component to be resolved is 200 cycles per second, it will require 5 times 200, or 1000, samples per second of each of the signals or traces examined, assuming 5 samples per cycle. For a total of 10 signals to be examined, the required sampling rate is thus 10,000 samples per second, considerably in excess of a sampling rate conveniently obtainable by mechanical means. In such a case, the electronic sampling arrangement shown diagrammatically in Fig. 6 may be utilized.

In Fig. 6, reference numerals 6, 7 and 8 again represent pickup means for converting the information on a reproducible record into electrical signals corresponding to such information. Although only three such pickups are shown in Fig. 6 for simplicity, it will be obvious that more such pickups could be utilized if desired. Each pickup is connected to an associated adding device 101, 102 and 103 to add bias signals to the output signals of devices 6, 7 and 8. Adders 101, 102 and 103 have been shown as being variable to indicate that the amplitudes of the bias signals introduced by these devices may be varied. Devices 101, 102 and 103 are, in turn, connected to electronic switches shown diagrammatically at 104, 105 and 106.

Switches 104, 105 and 106 each are connected to input terminals of a mixer 107. Mixer 107 is connected through an amplifier 108 to the vertical deflection plates 109a of an oscilloscopic display device in the form of a cathode ray tube 109. Switches 104, 105 and 106 are also connected to a suitable source of gating pulses to control their periods of operation. Such a source of gating pulses may comprise a ring counter 118 having its three output circuits connected, respectively, to switches 104, 105 and 106. The ring counter is controlled by suitable means such as a trigger generator 119 connected to the counter. Trigger generator 119 also preferably controls a brightening pulse generator 120 which is connected to cathode 109d and grid 109c and which controls the intensity of the beam of cathode ray tube 109 in a manner similar to switch 61 and battery 62 of Fig. 1.

The output of time-base generator 41 is connected to a plurality of adding devices 121, 122 and 123 for adding different voltages to the output of the time-base generator. Devices 121, 122 and 123 are connected to electronic switches 124, 125 and 126, and these switches, in turn, each are connected to input terminals of a mixer 127. Mixer 127 is connected to an amplifier 128 which supplies a horizontal deflection component to horizontal deflection plates 109b of tube 109. Switches 124, 125 and 126 are also connected to ring counter 118 to control the operation of these switches.

The operation of the embodiment of Fig. 6 is similar to that described above for the embodiment of Fig. 1. The output signals of pickups 6, 7 and 8 are combined with the bias signals from adders 101, 102 and 103 to impress on switches 104, 105 and 106 a group of signals corresponding to the traces on the reproducible record but differing from each other by the bias signals introduced by the adders. Similarly, the output of time-base generator 41 is combined with the bias signals from adders 121, 122 and 123 to impress on switches 124, 125 and 126 a group of signals linearly proportional to time but differing from each other by the bias signals introduced by the adders 121, 122 and 123.

The operation of switches 104, 105 and 106 is synchronized to the operation of switches 124, 125 and 126 by trigger generator 119 and ring counter 118, so that switches 104 and 124 are conductive at the same time, switches 105 and 125 are conductive at the same time, and switches 106 and 126 are conductive at the same time, in a manner similar to the operation of mechanical switches 22 and 55 of the embodiment of Fig. 1. Switches 104, 105, 106, 124, 125 and 126 thus supply through mixers 107 and 127 and amplifiers 108 and 128 two series of vertical and horizontal deflection pulses, respectively, to tube 109 to control the position of the beam of cathode rays on the tube screen.

Assuming that the wave forms of the signals supplied by time-base generator 41 and pickups 6, 7 and 8 of Fig. 6 were similar to those shown in Figs. 2 and 4 for the embodiment of Fig. 1, the apparatus will operate in a manner similar to that of Fig. 1 to cause tube 109 to display a series of curves similar to that shown in Fig. 5.

Although but two embodiments of the present invention have been illustrated and described, it will be apparent to those skilled in the art that various changes and modifications may be made therein without departing from the spirit of the invention or the scope of the appended claim.

I claim:

Apparatus for analyzing data in the form of a plurality of signals comprising means for generating a first plurality of variable voltages corresponding to said signals, means for adding a first constant bias voltage to each of said first plurality of variable voltages to produce a first group of deflection voltages, the magnitude of each of said first bias voltages being different, means for generating a second plurality of voltages dependent upon an independent variable to which said data is related, means for adding a second constant bias voltage to each of said second plurality of voltages to produce a second group of deflection voltages, the magnitude of each of said second bias voltages being different, oscilloscopic display means having an index deflectable over a display surface in two dimensions, means for sequentially applying portions of said first group of deflection voltages as deflection pulses to said oscilloscopic display means to deflect said index in one of said dimensions, and means for sequentially applying portions of said second group of deflection voltages as deflection pulses to said oscilloscopic display means to deflect said index in the other of said dimensions in synchronism with the application of said portions of said first group to graphically present said signals on said display surface displaced from each other in said one dimension by amounts corresponding to the differences between said first bias voltages and displaced from each other in said other dimension by amounts corresponding to the differences between said second bias voltages.

References Cited in the file of this patent

UNITED STATES PATENTS

| | | |
|---|---|---|
| 2,378,383 | Arndt | June 19, 1945 |
| 2,484,618 | Fisher | Oct. 11, 1949 |
| 2,628,689 | Rieber | Feb. 17, 1953 |
| 2,658,579 | Rieber | Nov. 10, 1953 |